United States Patent
Padovani

(10) Patent No.: US 6,398,538 B1
(45) Date of Patent: Jun. 4, 2002

(54) TEMPLATE CONVEYOR FOR USE IN A THERMOFORMING PRESS

(75) Inventor: Pietro Padovani, Verona (IT)

(73) Assignee: ISAP OMV Group SpA, Verona (IT)

( * ) Notice: Subject to any disclaimer, the term of this patent is extended or adjusted under 35 U.S.C. 154(b) by 0 days.

(21) Appl. No.: 09/419,242

(22) Filed: Oct. 15, 1999

(30) Foreign Application Priority Data

Oct. 21, 1998 (IT) .......................... VR98A0091

(51) Int. Cl.⁷ .............................................. B65G 33/02
(52) U.S. Cl. ...................... 425/347; 425/453; 425/454; 425/DIG. 108; 425/DIG. 201; 198/465.1; 198/468.6; 198/867.14
(58) Field of Search ................. 425/347, 359, 425/360, 361, 403.1, 453, 454, DIG. 108, DIG. 201; 198/465.1, 468.5, 867.14

(56) References Cited

U.S. PATENT DOCUMENTS

| 1,054,459 A | * | 2/1913 | Schwartz ................. 198/465.2 |
| 3,268,055 A | * | 8/1966 | Stein et al. ............ 198/457.03 |
| 4,567,979 A | | 2/1986 | Hoehn ....................... 198/750 |
| 5,591,463 A | | 1/1997 | Padovani .................... 425/359 |
| 6,082,256 A | * | 7/2000 | Hellmeier et al. ............ 101/35 |

FOREIGN PATENT DOCUMENTS

| DE | 93 19 995 U | 5/1994 |
| EP | 0 089 543 A | 9/1983 |
| FR | 2 324 546 A | 4/1977 |

* cited by examiner

Primary Examiner—Nam Nguyen
Assistant Examiner—Donald Heckenberg
(74) Attorney, Agent, or Firm—Daniel O'Byrne

(57) ABSTRACT

A plane-template conveyor for a thermoforming plant for obtaining a plurality or moulding of thermoformed hollow objects including at least one thermoforming press having at least one male die or mould, at least one female die and at least one picking up and transferring group for sequentially picking up and transferring mouldings of thermoformed objects from a die to a template conveyor, the said conveyor comprising a support frame which delimits an endless path, a plurality of templates movably mounted on the said endless path and each having a number of receiving seats equal to that of the objects of one mould, a plurality of driving means spaced along the said endless path to cause a sequential and discontinuous movement of the said templates at a predetermined speed between one template and the other.

29 Claims, 6 Drawing Sheets

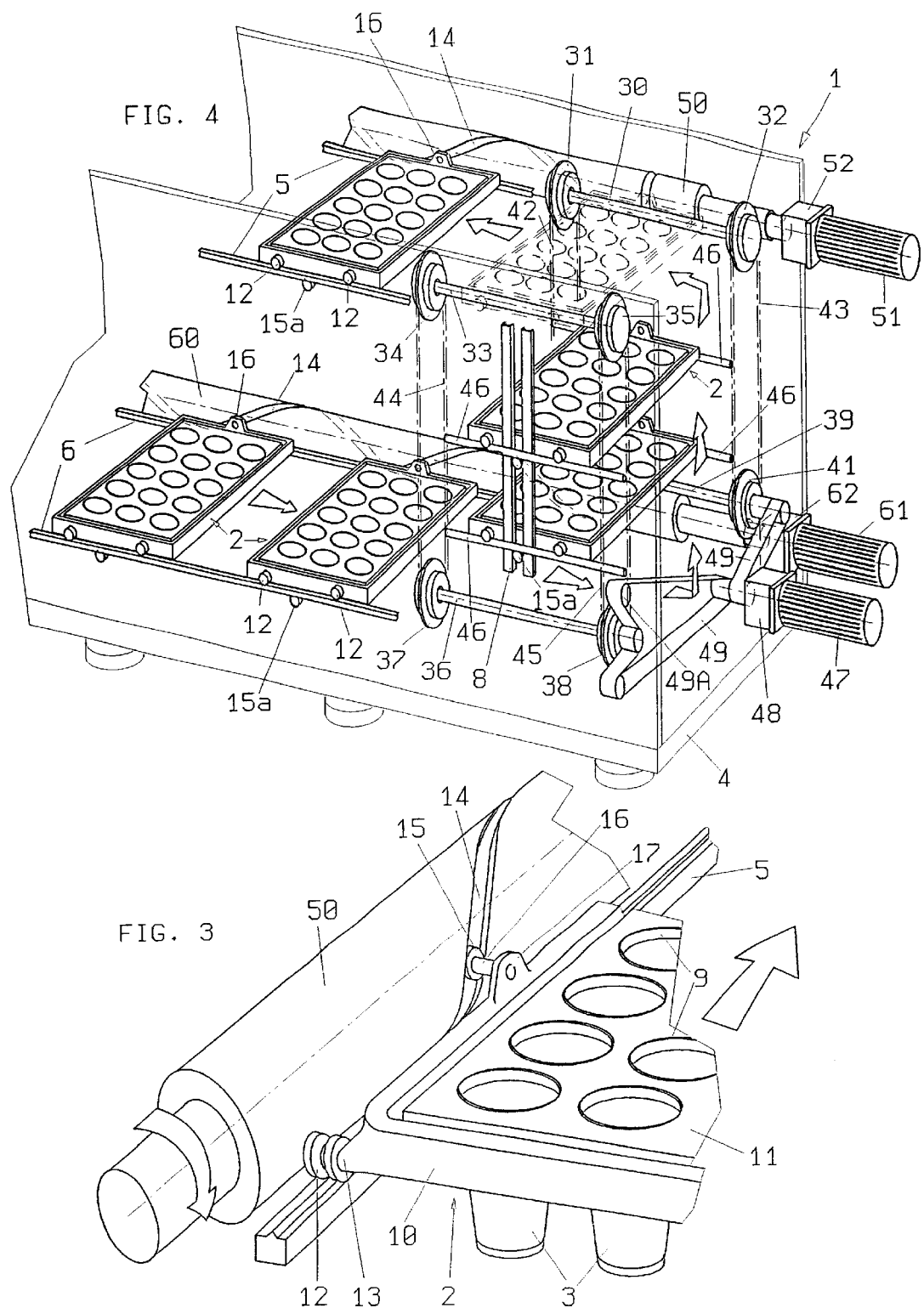

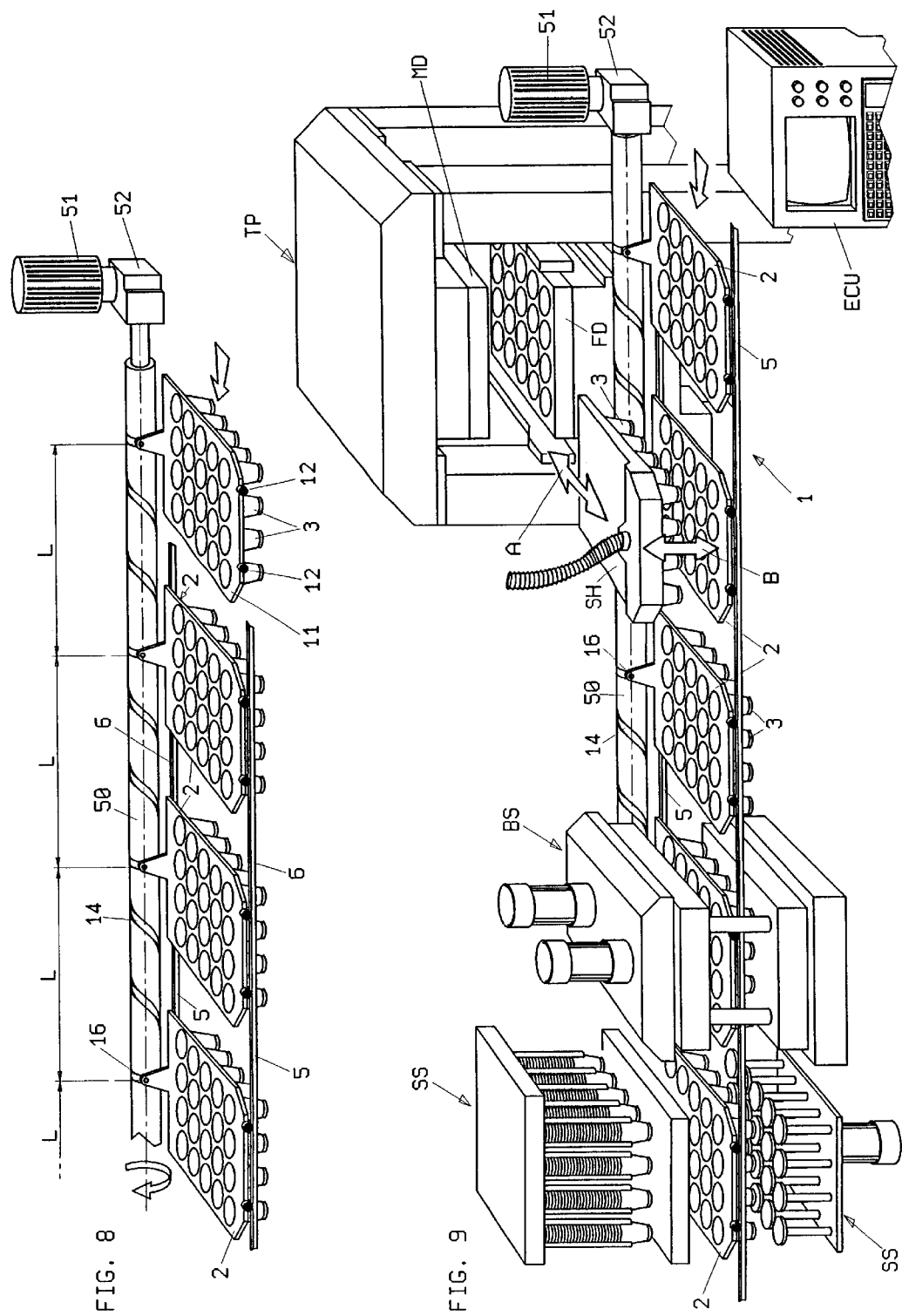

TEMPLATE CONVEYOR FOR USE IN A THERMOFORMING PRESS

BACKGROUND OF THE INVENTION

The present invention relates to a template or plate conveyor for use in a thermoforming press and more particularly for receiving and moving mouldings of objects thermoformed in the thermoforming press throughout a plurality of working or treatment stations, while keeping the thermoformed objects in the mutual position in which they were obtained in the mould of the thermoforming press.

It has already been suggested in the art of thermoforming objects to use a modular template or plate conveyor for carrying thermoformed objects through one or more stations at which the objects are worked or treated. Such conveyors comprise a pair of chains carried and wound on two pairs of spaced co-axial sprocket wheels which delimit two parallel (going and return) lengths or runs at least one of which is provided with driving means for moving the conveyor forwards, and a plurality of templates or plates extending across the two chains and kept at a predetermined distance or pitch from one another by the same chains. The distance between the various plates is determined, as it is clearly understood, by the dimensions (length) of the modular plates, by the total length of the conveyor and by the mutual distance of the working or treatment stations at which the plates and thus the objects must stop. One such conveyor is disclosed in U.S. Pat. No. 5,591,463.

The plate or template conveyors used up to now have a number of disadvantages that, besides making their use complicate, limit to a significant extent the efficiency of the whole thermoforming system.

The mere fact of providing a necessarily fixed pitch between the various templates carried by the chains makes it necessary to adapt the positioning and the distance between the various working or treatment stations to such a pitch, which is not easy task nor is it always permissible since it would be necessary to have wide overall spaces (especially spaces extending in length) available for the conveyor and one must take into account that other components of the thermoforming system occupy part of the available space.

Moreover, it is necessary to use an excessive and never optimum number of templates since they must stop at waiting, and thus quite often idle, zones in order to comply with the need of a constant pitch between the templates. For the same reason the templates or plates must all effect movements equal in length and at the same speed owing to their constraint with the carrying chains.

Thus, with passing of the time positioning inaccuracies and parallelism inaccuracies of the various templates occur at the work (working or treatment) stations owing to irregular elongation of the chains and unavoidable differences in the thermal expansion-shrinkage and traction between the two chains, inaccuracies that quite often get worse as a result of repeated adjustments of the chain tension, wear and friction between the chain links and the slide guides of the chains.

The use of chains also causes noise which increases with prolonged use owing to irregular elongations and wear that are not compensated by the chain links, which results in bad mashing between the chains and the pairs of sprocket wheels that support and drive the chains, low transmission efficiency and consequent waste of driving energy.

Moreover, the return runs of the chains at the pairs of sprocket wheels for supporting and driving the chains instability problems arise which makes sometime difficult to keep the objects in their respective receiving seat in the transport template, especially when dealing with very low objects with relatively large dimensions, owing to the fact that components of inertial forces crop up which act on the object, e.g. in the sense of lifting and ousting them from their seats in the template along the descending length of the conveyor.

Finally, it is almost always difficult to provide work stations between the forward and backward runs of the chains, also because the distance between the chains depends upon the diameter the sprocket wheels, which cannot exceed certain limits otherwise the conveyor would be exceedingly cumbersome.

SUMMARY OF THE INVENTION

The main object of the present invention is to provide a template conveyor for a thermoforming press, in which templates move in sequence along a closed or endless path without the use of restraining chains between the templates, but independently from each another, i.e. with the possibility of making movements that differ both in length and speed to eliminate or drastically reduce the above mentioned drawbacks in the thermoforming presses provided with conventional conveyors.

Another object of the present invention is to provide a template conveyor for a thermoforming press, which ensures a high degree of accuracy both in the stopping and parallelism positioning between the templates or in the attitude of the templates even after long intervals of work without the need of conducting periodical settings.

Not least object of the present invention is that of providing a template conveyor for a thermoforming press which makes it possible to obtain a high production in the time unit, high transmission efficiency, and thus a low driving energy consumption and high reliability.

In accordance with one preferred aspect of the present invention, there is provided a plane-template conveyor for a thermoforming plant for obtaining a plurality or moulding of thermoformed hollow objects including at least one thermoforming press having at least one male die or mould, at least one female die and at least one picking up and transferring group for sequentially picking up and transferring moulds of thermoformed objects from a die to a template conveyor, the said conveyor including a support frame which delimits an endless path and a plurality of templates movably mounted on the said endless path and each having a number of receiving seats equal to that of the objects of one mould, characterized in that it comprises a plurality of driving means spaced along the said endless path to cause a sequential and discontinuous movement of the said templates, but at a predetermined speed between one template and the other.

Advantageously, the said path comprises a first and a second straight guide paths and an end connecting path at each end of the said first and second straight paths, along which the said templates are kept in a constant parallelism attitude.

Moreover, the said driving means advantageously comprises a rotatable cam having a helicoidal variable-pitch profile extending along the said first and second straight paths for sliding engagement with at least one template along the said straight paths, and transfer means for transferring the said template from the said first path to the said second path.

BRIEF DESCRIPTION OF THE DRAWINGS

Further aspects and advantages of the present invention will better appear from the following detailed description of some presently preferred embodiments thereof given by way of illustrative and non limiting example only with reference to the accompanying drawings, in which:

FIG. 3 is a perspective view in an enlarged scale showing a slide guide that delimits a length of straight path for the templates, and the sliding engagement between template and driving rotating cam along the same path;

FIG. 4 is a partial perspective view similar to FIG. 2 but illustrating a modification of the template conveyor;

FIG. 8 shows a modification of the template conveyor according to the invention, where each template is moved in sequence by a rotatable constant pitch cam; and FIG. 9 shows a thermoforming plant comprising a thermoforming press and a template conveyor without chains according to the present invention.

DESCRIPTION OF THE PREFERRED EMBODIMENTS

Figure 1:
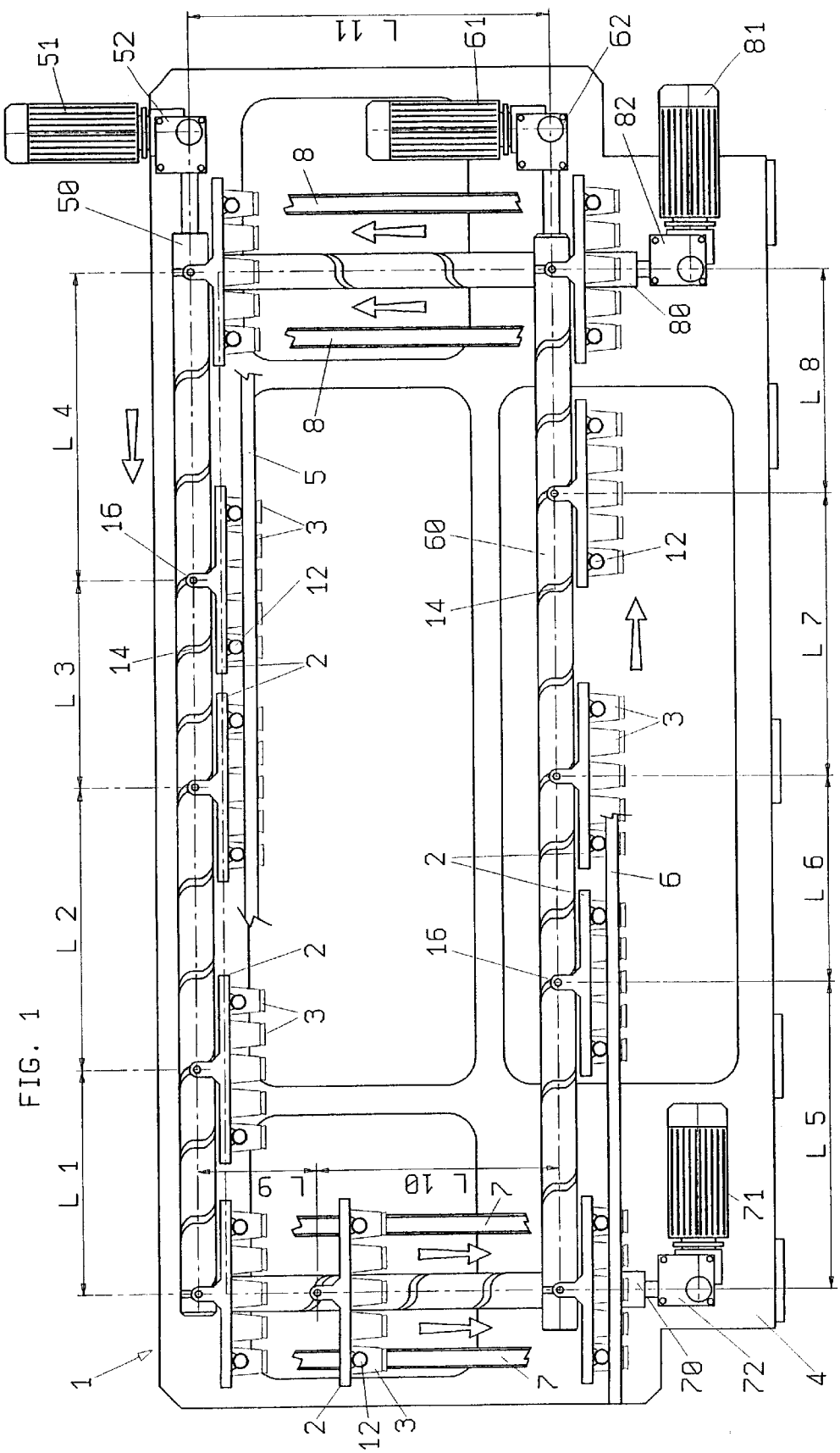
FIG. 1 shows a diagrammatic front elevational view of a template conveyor having an upper horizontal straight path, a lower horizontal straight path and two end vertical paths: a descent and a riascending paths for the templates.
Figure 2:
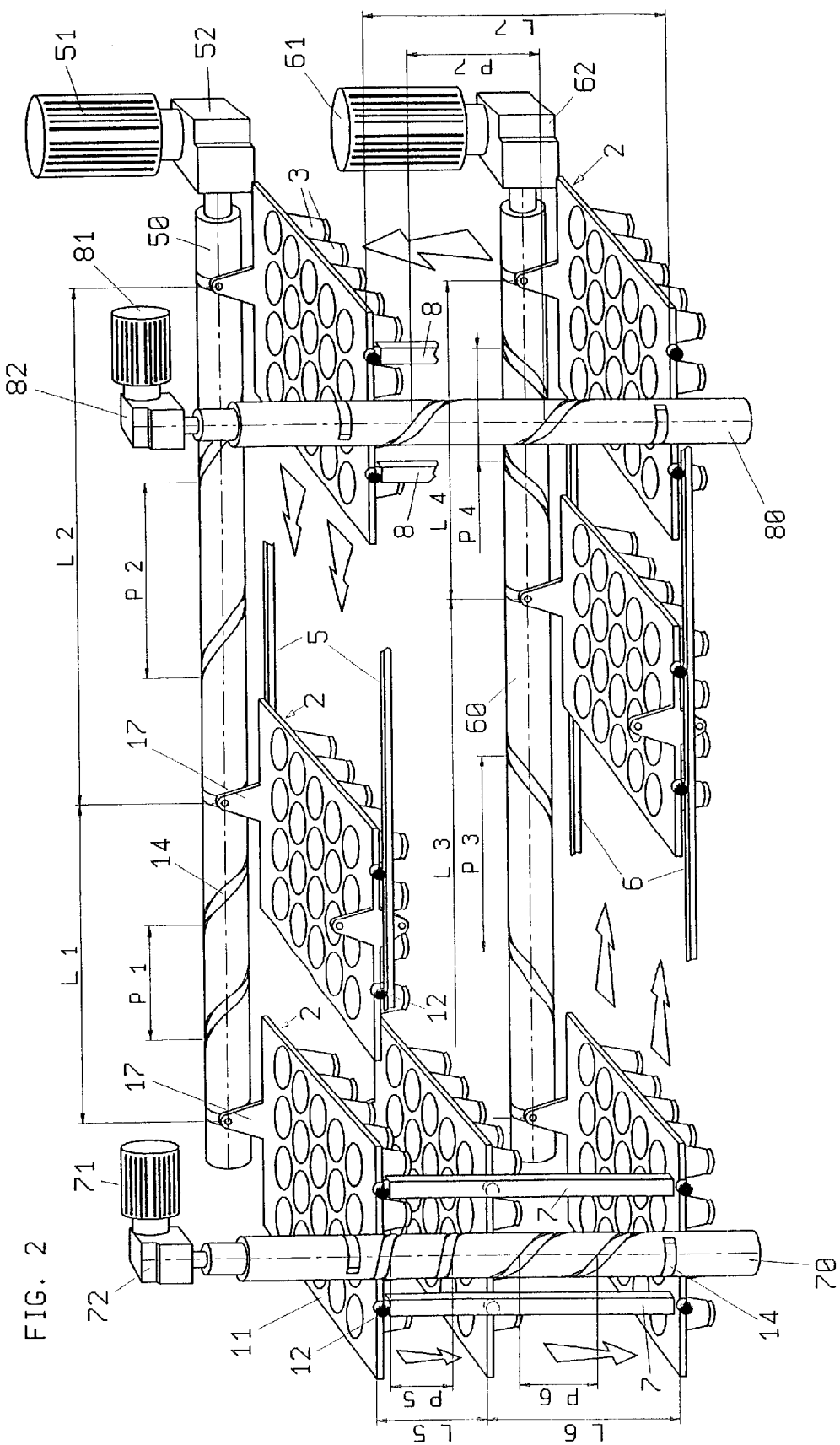
FIG. 2 is a front perspective view slightly from above with parts cut away and some modifications in the pitch of the cams of the conveyor of FIG. 1.

In the accompanying drawings the same or similar parts or components are indicated with the same reference numerals.

With reference first to FIGS. 1 to 3, and 9, 1 generally indicates a template conveyor according to the invention having plane templates 2 and being designed to co-operate with a thermoforming press TP of the type having one or two female dies FD, a male die or counterdie MD co-operating with the or each female die FD and at least one pick up unit SH, e.g. including a sucking head or plate, arranged to sequentially pick up moulds of thermoformed objects 3 (e.g. bickers, cups vases and the like), i.e. all the thermoformed objects in the female FD die for each thermoforming operation of the press, and to transfer them to the template conveyor 1.

The head or plate SH is thus designed to effect to and fro horizontal movements according to the arrow A between a pick up position between the female die FD and the male die MD, when the same are in their opened position, and an object delivery position above a template 2, as well as vertical movements (arrow B) both in the pick up position and in the delivery position.

The use of a conveyor according to the present invention however, is not limited to a specific system including a pick up plate or head SH for removing thermoformed objects 3 from a thermoforming die FD or MD and for delivering the same to templates 2 on the conveyor. Such a system can be of any suitable type, e.g. of the type in which the plate or head SH makes angular and/or rotational movements between a die FD or MD and the various templates 2 of the template conveyor.

The template conveyor 1 comprises a support frame generally indicated at 4, which supports a pair of upper horizontal straight parallel guides 5, a pair of lower horizontal straight parallel guides 6, preferably having the same length as the upper guides 5 and arranged at a desired distance $L_{11}$ vertically below thereof, two pairs of vertical descent guides 7 and two pairs of vertical rise guides 8, the vertical guides 7 and 8 being arranged at a respective end of the guides 5 and 6.

With a conveyor structured as described above a plurality of templates 2 are sequentially transferred, which along the four distinct sections forming the endless path can effect a number n of travels, each of which can be effected in different ways $L_1, L_2, L_3, \ldots L_n$ independently from one another in conformity with the variable pitch of the cams 14. In this way it is possible to optimise, e.g. depending upon the number and the position of the various work stations, the required stopping time at each station. etc., both the number of templates to be used and the speed of motion during each specific travel while getting nearer or moving away from a given work station. The speed of motion of the templates include a dwell speed.

Adjacent and parallel to the slide guides 5 to 8 there extends and is mounted for rotation a respective shaft 50, 60, 70 and 80, along which a respective uninterrupted helical groove 14 is formed, which has a variable or irregular pitch $P_1, P_2, \ldots P_n$. Each cam 14 is designed slidably to engage with a roller 15, e.g. mounted for rotation with interposition of a suitable antifriction bearing (not shown) on a pin 16 which is carried laterally overhanging from a tab 17, e.g. provided at the centre line of a side of each carriage 10.

The shafts 50, 60, 70 and 80 are each driven by a respective driving means, e.g. a group comprising an electric motor 51, 61, 71 and 81 and reduction unit 52, 62, 72 and 82, a control unit ECU of any suitable type being arranged to control and synchronise the operation of the motors 51 to 81 with the cycle speed of the thermoforming press. It will be noted that along the upper and lower straight sections the various templates 2 are supported by their respective guides 5 and 6 and driven by their respective cams 14, whereas along the vertical sections they are supported and driven by their respective cams 14 and simply guided by the guides 7 and 8 for keeping their horizontal attitude.

With a conveyor structured as described above a plurality of templates 2 are sequentially transferred, which along the four distinct sections forming the endless path can effect a number n of travels, each of which can be effected in different ways $L_1, L_2, L_3, \ldots L_n$ independently from one another in conformity with the variable pitch of the cams 14. In this way it is possible to optimise, e.g. depending upon the number and the position of the various work stations, the required stopping time at each station, etc., both the number of templates to be used and the speed of motion during each specific travel while getting nearer or moving away from a given work station.

In the drawings (FIG. 9) only one boring station BS, at which the bottom of the objects (beakers) 3 is pierced or drilled and an end stacking station SS of any suitable type, e.g. of the type well known in the art, it being understood that upstream or downstream of the piercing station also other working stations can be provided, such as a curling station, a sterilisation station, etc., distributed along the travelling path of the templates 2.

Moreover, there is ensured an accurate and unchanged sequential positioning of the various templates in the long run at each work station owing to the fact that, since sliding of only rolling elements (rollers 15, bearings) is involved, only a practically negligible wear occurs and thus there is no play between the moving parts, which results in accuracy in the working of the objects 3, always high transmission efficiency and high operation silentness.

It will be easily understood that the distance in height between upper and lower straight run of the conveyor 1 can be chosen at will without correspondingly increasing the dimensions in length of the conveyor, or rather with the possibility of shortening the horizontal sections right because a certain number of working or treatment stations for the objects 3 can be arranged along the vertical sections of the endless path.

Particularly important is also the fact that it is possible to vary the motion speed of the templates along the vertical sections of the descent and rising paths in order to better control the inertial reactions and the effects of the air resistance on the transported objects 3 with no risk that the same, especially when dealing with objects having a relatively small height (e.g. this is the case with covers, plates, dishes and the like) are ousted from their respective receiving seat 9 in the template.

In the embodiment shown in FIG. 4 instead of the rotating shafts 70 and 80 there is provided a lowering and rising device for the templates 2 which comprises four horizontal parallel shafts 30, 33, 36 and 39 each provided at its ends with a sprocket wheel 31, 32; 34, 35; 37, 38 and 40 (not visible in the drawings), 41, respectively, and arranged in two pairs each including an upper and a lower horizontal shaft connected to one another by two toothed belts 42, 43 and 44n 45, respectively, wound on respective sprocket wheels 31, 40; 32, 41; 34, 37; 35, 38. The pairs of toothed belts 42, 43 and 44, 45 each supports a plurality of transverse (horizontal) parallel and spaced bars 46 arranged to move in sequence in alignment with the lower and upper guides 6 and 5 for receiving or delivering a template 2, which rests with the rollers 12 thereof on a pair of bars 46 and an intermediate roller 15a thereof is engaged between two vertical guides 7, 8. The system is driven by one source of motion, e.g. comprising an electric motor 47, and the motion from the motor 47 is transmitted, e.g. to the shafts 36 and 39 through a reduction unit 48 and two belts 49 with belt stretcher 49A. Motor 47 is of course controlled by the centralised control unit ECU (FIG. 9). This embodiment makes it possible to attain high versatility in the conveyor performance.

Figure 5:
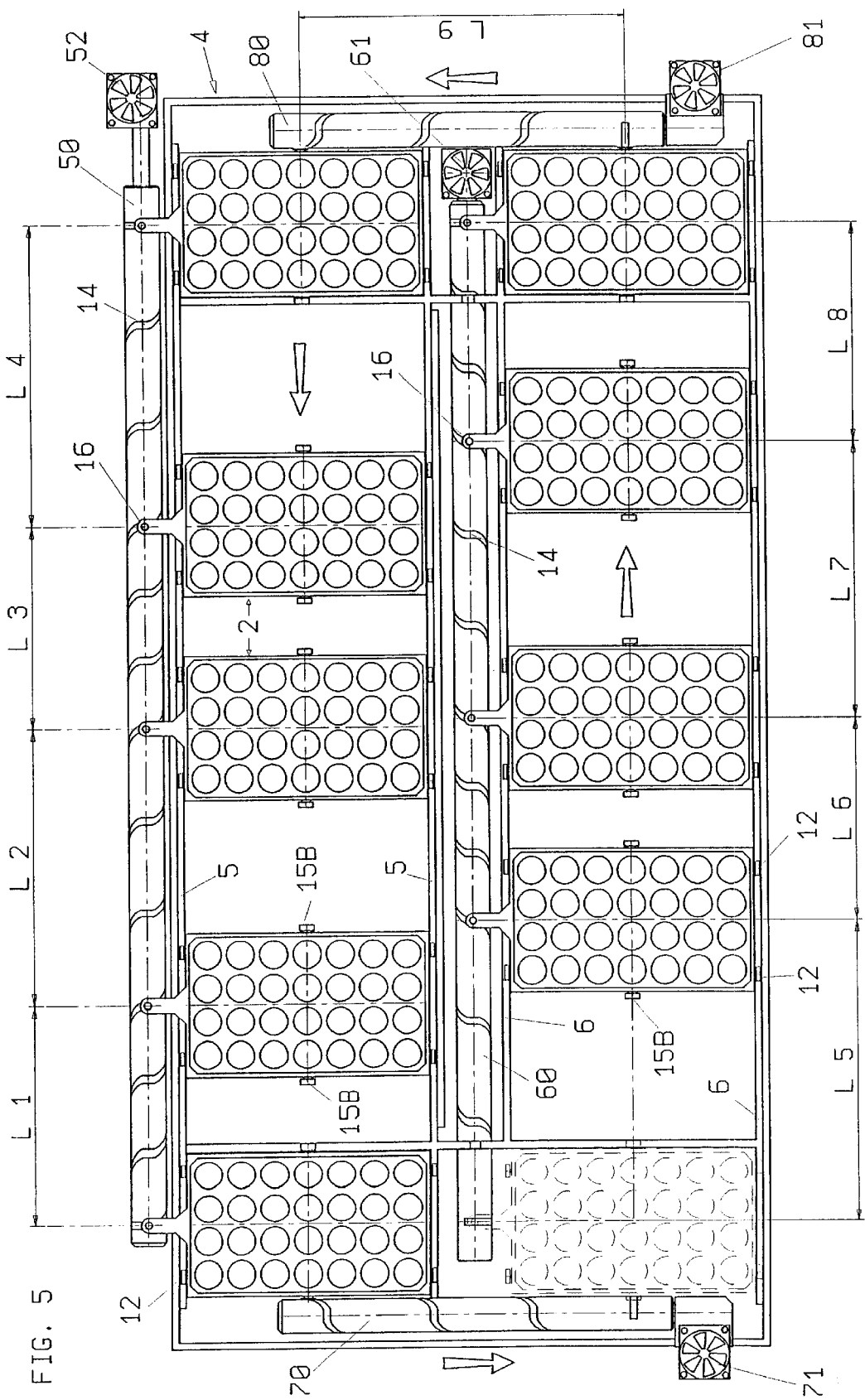
FIG. 5 a diagrammatic top plane view of an embodiment of the template conveyor according to the invention, in which templates are sequentially moved forward along an endless path extending in one horizontal plane.

FIG. 5 illustrates an embodiment of the conveyor which keeps the templates or plates 2 always on the same horizontal plane, the guides 5, 6 and 7, 8 as well as the shafts 50, 60, 70 and 80 being coplanar. In this embodiment the carriages for the templates have a pair of rollers 15b at the long sides of the template.

Figures 6, 7:
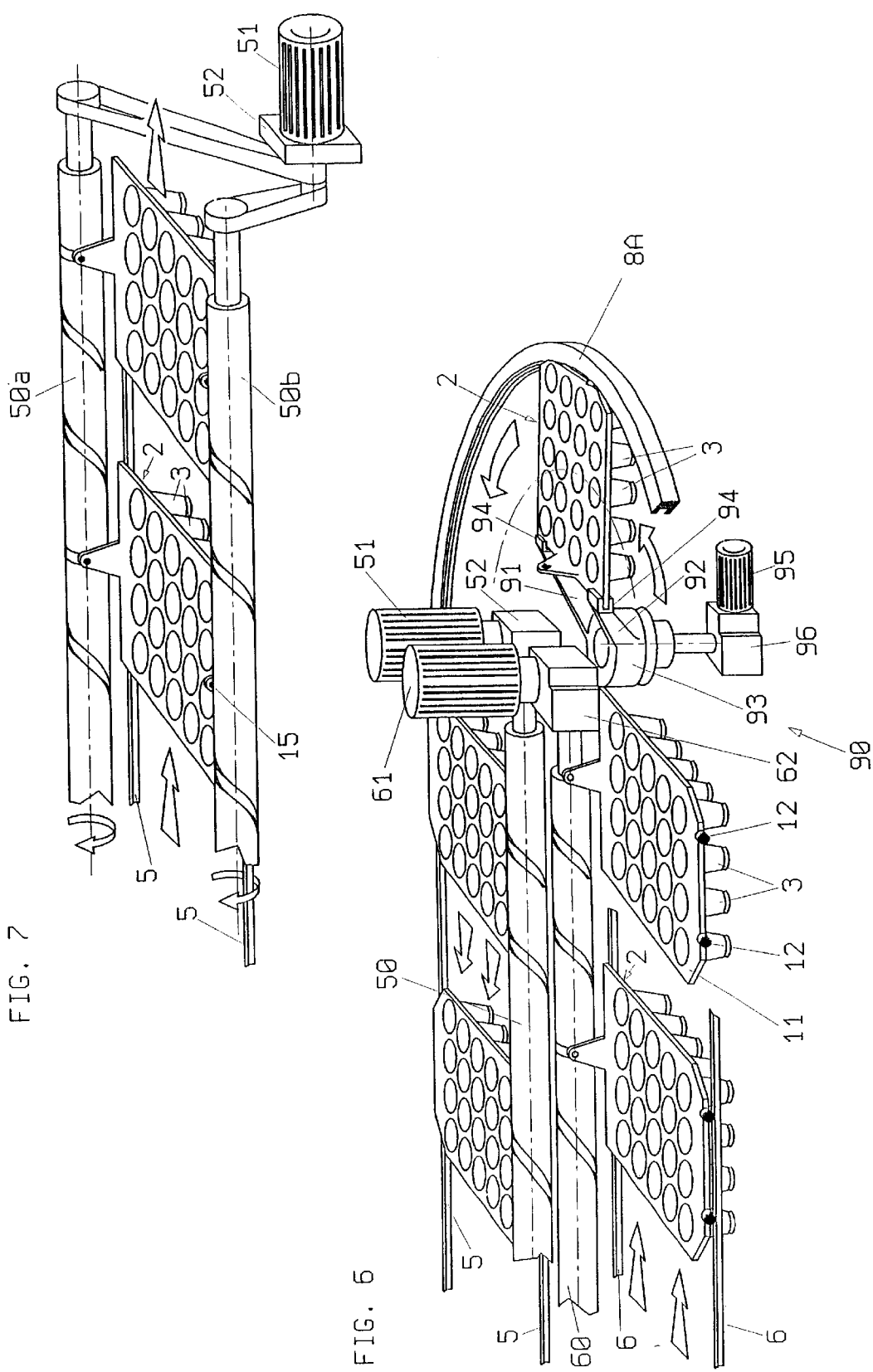
FIG. 6 is a partial perspective view of the conveyor of FIG. 5 having end curved paths connecting two straight paths.
FIG. 7 shows a modification of the conveyor according to the invention, in which each template is sequentially moved by a pair of rotating cams.

The embodiment shown in FIG. 6 is similar to that illustrated in FIG. 5, but at the ends of the guides 5 and 6 and the shafts 50 and 60 coplanar therewith there is provided a merry-go-round transfer device 90 arranged to receive a template 2 at an end of one pair of guides 5 or 6 and to transfer it along a curved sliding guide 8a at the adjacent end of the other pair. More particularly, the merry-go-round device 90 can comprise two arms 91 and 92 projecting from a rotatable head 93 and terminating with a respective engaging element 94, e.g. a pliers element, arranged to engage an edge of a template for transferring it with possible stops for working or treatment of the objects from one pair of guides to another, while being controlled by a reversible motor 95 and a reduction unit 96.

FIG. 7 shows an embodiment of the conveyor in which each template is driven along various guides by a respective pair of specularly equal cam shafts 50a, 50b and similarly pairs of cam shafts in replacement of shafts (60, 70, and 80 of FIG. 1, driven by the same motor-reduction unit, e.g. by a toothed belt transmission.

Finally, FIG. 8 is similar to FIG. 1, but has cut away parts and relates to a modification in which the shaft 50 is provided with a cam 14 having a constant pitch between a template 2 and another.

The template conveyor as described and illustrated above is susceptible to numerous modifications and variations within the scope as defined by the claims.

Although the invention has been described with reference to particular means, material, and embodiments, it is to be understood that the invention is not limited to the particulars disclosed and extends to all equivalents within the scope of the claims.

The instant application is based upon Italian patent application VR98A000091, filed on Oct. 21, 1998, the disclosure of which is hereby expressly incorporated by reference thereto, and the priority of which is hereby claimed under 35 U.S.C. §119.

What is claimed is:

1. A template conveyor comprising a support frame which delimits an endless path with at least one path section extending horizontally and at least one path section extending vertically, a plurality of templates movably mounted in sequence along said endless path and each template having a number of receiving seats for locating a respective object, and a driving means for said templates, wherein the said driving means are spaced along the said endless path to cause a predetermined relative movement between the said templates, thereby a first template is moved at one predetermined speed and a second template is moved at a different predetermined speed, and said templates are kept in constant substantially horizontal orientation such that a same side of said templates faces upward throughout said endless path.

2. A template conveyor as claimed in claim 1 wherein said one predetermined speed includes a dwell speed.

3. A template conveyor as claimed in claim 1 wherein the said driving means are so arranged as to cause said templates to vary their speed along said endless path.

4. A template conveyor as claimed in claim 1 wherein the said endless path comprises a plurality of path sections each comprising a respective driving means.

5. A template conveyor as claimed in claim 4, wherein the said endless path comprises a first and a second straight and parallel path sections and end path sections connecting the said first and second path sections.

6. A template conveyor as claimed in claim 4, wherein the said endless path comprises two straight substantially parallel horizontal path sections and two substantially parallel vertical end path sections.

7. A template conveyor as claimed in claim 4 wherein the said driving means comprises at least one rotatable shaft extending substantially parallel to a respective path section and formed with a helicoidal profile cam, and a cam follower secured to each template and suitable for engagement with said cam.

8. A template conveyor as claimed in claim 7 wherein the said helicoidal cam extends in axial direction of its respective shaft at a variable pitch.

9. A template conveyor as claimed in claim 7 wherein the said helicoidal cam is a groove in which the said cam follower is engaged.

10. A template conveyor as claimed in claim 5, wherein said end path sections have control means arranged to move templates at the same speed.

11. A template conveyor as claimed in claim 10 wherein said driving means comprises at least one pair of belts and at least one pair of bars carried by said belts.

12. A template conveyor as claimed in claim 10, wherein said driving means on a path section comprises at least one arm arranged temporally to engage a template.

13. A thermoforming plant for obtaining a plurality or a moulding of thermoformed hollow objects including:
- a thermoforming press (TP) having at least one female die (FD) and at least one male die (MD);
- a transferring group for sequentially picking up mouldings of thermoformed objects from the thermoforming press (TP) and transferring them to a template having a respective receiving seat for each object; and
- a template conveyor designed to convey said objects on templates to at least one working station (BS, SS) along a predetermined endless path with at least one path section extending horizontally and at least one path section extending vertically;

wherein said template conveyor comprises a plurality of driving means spaced along said path, thereby causing sequential and discontinuous movement of each template at a predetermined relative speed between one template and the others and said templates are kept in constant substantially horizontal orientation such that a same side of said templates faces upward throughout said endless path.

14. A plant as claimed in claim 13, wherein the said predetermined speed comprises a variable speed along said endless path.

15. A plant as claimed in claim 13, wherein the said predetermined speed comprises zero or dwell speed.

16. A plant as claimed in claim 13, wherein the said predetermined speed comprises a uniform speed between one template and the other.

17. A plant as claimed in claim 13, wherein the said path comprises a first and a second straight and parallel guide paths and an end connecting path at the ends of the said first and second straight paths, along which the said templates are kept in a constant mutual parallel attitude.

18. A plant as claimed in claim 17, wherein the said first and second paths and each end path comprises a respective driving means.

19. A plant as claimed in claim 18, wherein the said driving means comprises at least one helicoidal rotatable cam arranged along the said first and second straight path for sliding engagement with a template along the said straight paths and template transfer means from the said first to the said second path.

20. A plant as claimed in claim 19, wherein each rotatable cam has a helicoidal variable-pitch profile.

21. A plant as claimed in claim 19, wherein each cam has a helicoidal constant-pitch profile.

22. A plant as claimed in claim 19, wherein the said transfer means for the templates between the said first and second paths comprises at least one pair of straight guides and at least one rotatable helicoidal profile cam arranged along each pair or pairs of straight guides.

23. A plant as claimed in claim 22, wherein each cam has a helicoidal variable-pitch profile.

24. A plant as claimed in claim 22, wherein each cam has a helicoidal constant-pitch profile.

25. A plant as claimed in claim 22, wherein each pair of straight guides and rotatable helicoidal profile cam or rotatable helicoidal profile claims extend at right angles with respect to the said first and second straight paths.

26. A plant as claimed in claim 22, wherein each pair of straight guides and the or each rotatable helicoidal profile cam extend on the same plane and at right angles with respect to the said first and the said second straight path.

27. A plant as claimed in claim 19, wherein the said transfer means for the templates between the said first and second paths comprises at least a pair of straight guides and at least a sequential template lifting or lowering device.

28. A plant as claimed in claim 27, wherein the said lifting or lowering device comprises two pairs of belt conveyors designed to sequentially engage with at least one side of each template.

29. A plant as claimed in claim 13, comprising at least one work or treatment station arranged along the said endless path and designed to work or treat each moulding of thermoformed objects carried by a respective receiving template on said template conveyor.

* * * * *